United States Patent
Mohan et al.

(10) Patent No.: US 11,559,760 B2
(45) Date of Patent: Jan. 24, 2023

(54) GROUNDED FILTER REGULATOR LUBRICATOR

(71) Applicant: Asco, L.P., Novi, MI (US)

(72) Inventors: Rawal Manoj Mohan, Pune (IN); Bradly J. Atkin, Stockbridge, MI (US)

(73) Assignee: Asco, L.P., Novi, MI (US)

( * ) Notice: Subject to any disclaimer, the term of this patent is extended or adjusted under 35 U.S.C. 154(b) by 317 days.

(21) Appl. No.: 16/638,195

(22) PCT Filed: Jul. 16, 2018

(86) PCT No.: PCT/US2018/042228
§ 371 (c)(1),
(2) Date: Feb. 11, 2020

(87) PCT Pub. No.: WO2019/036131
PCT Pub. Date: Feb. 21, 2019

(65) Prior Publication Data
US 2020/0360850 A1    Nov. 19, 2020

(30) Foreign Application Priority Data
Aug. 14, 2017 (IN) .............................. 201721028800

(51) Int. Cl.
*B01D 46/42* (2006.01)
*F16N 7/32* (2006.01)
(Continued)

(52) U.S. Cl.
CPC ........... *B01D 46/4209* (2013.01); *F16N 7/32* (2013.01); *F16N 19/003* (2013.01); *H01R 4/4809* (2013.01)

(58) Field of Classification Search
CPC ..... F16N 7/32; F16N 19/003; B01D 46/2411; H01R 4/2408; H01R 4/2407
See application file for complete search history.

(56) References Cited

U.S. PATENT DOCUMENTS 2,911,608 A    11/1959   Lee
3,122,604 A *   2/1964   Cook ....................... H01R 4/64
                                       439/444
(Continued)

FOREIGN PATENT DOCUMENTS

GB    2266199 B    8/1955
GB    2017426 B    8/1982
(Continued)

OTHER PUBLICATIONS

International Search Report and Written Opinion for International Application No. PCT/US2018/042228; dated Sep. 28, 2018; 9 pages.
(Continued)

*Primary Examiner* — Michael R Mansen
*Assistant Examiner* — Mark K Buse
(74) *Attorney, Agent, or Firm* — Reising Ethington P.C.

(57) ABSTRACT

A grounded FRL for treating a pressurized air supply has a housing with a connecting mechanism for connecting to a collector bowl. The collector bowl is made from a metal base material and has an open end with a connecting mechanism and a closed distal end. The housing has a flange that is electrically conductive and extending downwardly at an exterior of the bowl. At least one grounding clip member is made from electrically conductive material and has an exterior mounting end attached to the flange for electrical connectivity thereto and has a radially inner end that electrically makes contact with the metal base materials of the collector bowl and the housing.

11 Claims, 5 Drawing Sheets

(51) Int. Cl.
*H01R 4/48* (2006.01)
*F16N 19/00* (2006.01)

(56) References Cited

U.S. PATENT DOCUMENTS

| | | | | |
|---|---|---|---|---|
| 3,559,764 | A | * | 2/1971 | Wheeler, Jr. ............... F16N 7/34 |
| | | | | 55/423 |
| 3,572,469 | A | * | 3/1971 | Miller ....................... F16N 7/34 |
| | | | | 184/55.2 |
| 3,627,900 | A | * | 12/1971 | Robinson ............... H01R 4/4809 |
| | | | | 439/387 |
| 3,834,417 | A | | 9/1974 | Holben et al. |
| 3,912,046 | A | * | 10/1975 | Ferguson ................... F16N 7/34 |
| | | | | 210/136 |
| 5,081,696 | A | * | 1/1992 | Beck ....................... F24H 9/2021 |
| | | | | 439/106 |
| 5,451,167 | A | * | 9/1995 | Zielinski ................ H01R 4/646 |
| | | | | 439/435 |
| 6,106,310 | A | | 8/2000 | Davis et al. |
| 6,406,238 | B2 | | 6/2002 | Takeuchi et al. |
| 8,092,129 | B2 | | 1/2012 | Wiley et al. |
| 8,572,909 | B2 | | 11/2013 | Rivera et al. |
| 9,091,461 | B2 | | 7/2015 | O'Brien et al. |
| 9,151,449 | B2 | | 10/2015 | Sakai |
| 10,208,874 | B2 | * | 2/2019 | Geiger ...................... H02S 30/00 |
| 2009/0229231 | A1 | | 9/2009 | Treyz |
| 2013/0109249 | A1 | | 5/2013 | Roth |
| 2014/0220834 | A1 | | 8/2014 | Rizzo |
| 2016/0069495 | A1 | | 3/2016 | Statler, III et al. |
| 2016/0072432 | A1 | | 3/2016 | McCarthy et al. |

FOREIGN PATENT DOCUMENTS

| | | |
|---|---|---|
| GB | 2205203 B | 5/1991 |
| IN | 189915 | 5/2003 |
| WO | 2005068051 A1 | 7/2005 |
| WO | 2016065432 A1 | 5/2016 |

OTHER PUBLICATIONS

Extended European Search Report, Application No. 18846226.1-1007/3669087, Applicant: Asco, L.P., dated Apr. 4, 2021.

India Office Action, Application No. 201721028800, dated Aug. 16, 2021.

* cited by examiner

GROUNDED FILTER REGULATOR LUBRICATOR

TECHNICAL FIELD

The field of this invention relates to filter, regulator, and lubricator assemblies (commonly referred to as FRLs) and more particularly to a grounded FRL.

BACKGROUND OF THE DISCLOSURE

Industrial automation uses many control devices that are often powered or actuated by pneumatics. Pressurized air supplies need to be treated, e.g. filtered, regulated and/or lubricated before going to valves and actuators. Often the filters, regulators and lubricators used to treat the air supply share many components and look alike and are often installed in line in proximity to each other or even assembled togethers in combinations. The industry often refers to any individual filter, regulator, or lubricator assembly as an FRL. In this document, "FRL" will generically refer to a filter, regulator, or lubricator assembly or any combination thereof for use in treating a pressurized air supply.

The housing of an FRL (often referred to in the industry as an FRL head) is commonly grounded by being electrically connected to the incoming and outgoing piping that carries the air. Another part of the FRL is a collector bowl that is used to house the filter. The collector bowl is not directly connected to the piping but is screwed on or otherwise fastened to the housing. An intermittent problem however may occur with any FRL collector bowl because the quantity of air that passes into and out of the bowl often carries an electrical charge that can transfer to and build up in the collector bowl. If the bowl is not grounded to the housing, the static electrical buildup may build up to the point of causing an uncontrolled spark which is often undesireable in an industrial setting. Consequently, the collector bowls are commonly made from metal and attempts are made to ground it to the housing. However, it is common for a collector bowl and housing to be painted for cosmetic and protective reasons which may undesirably electrically insulate the metal of the collector bowl from the housing. Efforts have been made to provide the painted collector bowl and the painted housing with metal to metal contact such that the collector bowl is grounded through the housing and to the piping. However, due to manufacturing tolerances and consequentially possible loose fitting of the metal to metal connection, between the collector bowl and housing, the connection may be intermittently interrupted which then allows a buildup of static electricity.

What is desired is a reliable grounding system that establishes a reliable and physical metal-to-metal connection between the bowl and housing to ground the components together and prevent build-up of electrical charge. What is also desired is a spring-loaded metal-to-metal connection that provides a positive contact that compensates for any loose fitting due to manufacturing tolerances. What is also desired as an expedient and inexpensive connection system to electrically ground the bowl to the housing of an FRL that is cosmetically acceptable.

SUMMARY OF THE DISCLOSURE

In accordance with one aspect of the invention a grounded FRL for treating a pressurized air supply has a housing being made from, at least in part, a metal base material and having an inlet and outlet for passing fluid therethrough and a connecting mechanism for connecting to a collector bowl. The collector bowl is made from a metal base material and has an open end with a closed distal end and proximate connecting end that connects to the housing. The housing has a flange that is electrically conductive and extends downwardly about an exterior side of the collector bowl.

At least one grounding clip member is made from electrically conductive material having an exterior mounted end electrically grounded to the flange and has a radially inner end that comes to a contact point to be in electrical grounding contact with the metal base material of the collector bowl to electrically connect the metal base materials of the collector bowl and the housing.

Preferably, the at least one grounding clip member has its radially inner end curved upwardly to be above a lower distal end of the flange such that the scratch that it makes on the collector bowl is concealed from an observer who is looking from the side or above the housing flange. In one embodiment, the exterior end of the grounding clip member has an aperture for receiving a self-tapping screw that self-taps into the flange for making electrical connection with the flange.

Preferably the clip member has a generally J-shape and has its scratch point at the distal end of the J-shape and faces radially inward to the collector bowl. Furthermore, it is preferable that the grounding clip member is in a resilient state of compression when installed to assure positive connection between the housing and the collector bowl.

Preferably, an opposing grounding clip member is attached to the flange circumferentially spaced from and opposed to the grounding clip member and has a respective scratch point sufficient to scratch the insulating protective coating that is adhered to the exterior surface of the collector bowl and is in electrically grounding contact with the metal base materials of the collector bowl and the housing.

In one embodiment, the connecting mechanism for collector bowl and the housing have complementary protrusions that form a bayonet fitting to mount the collector bowl to the housing. The grounding clip member connects to the flange at a circumferentially aligned position with one of the protrusions of the housing and has its scratch point scratching the insulating protective coating that is adhered to an exterior surface of the collector bowl between two protrusions of the collector bowl.

BRIEF DESCRIPTION OF THE DRAWINGS

Reference now is made to the accompanying drawings in which.

DETAILED DESCRIPTION OF THE PREFERRED EMBODIMENT

Figure 1:
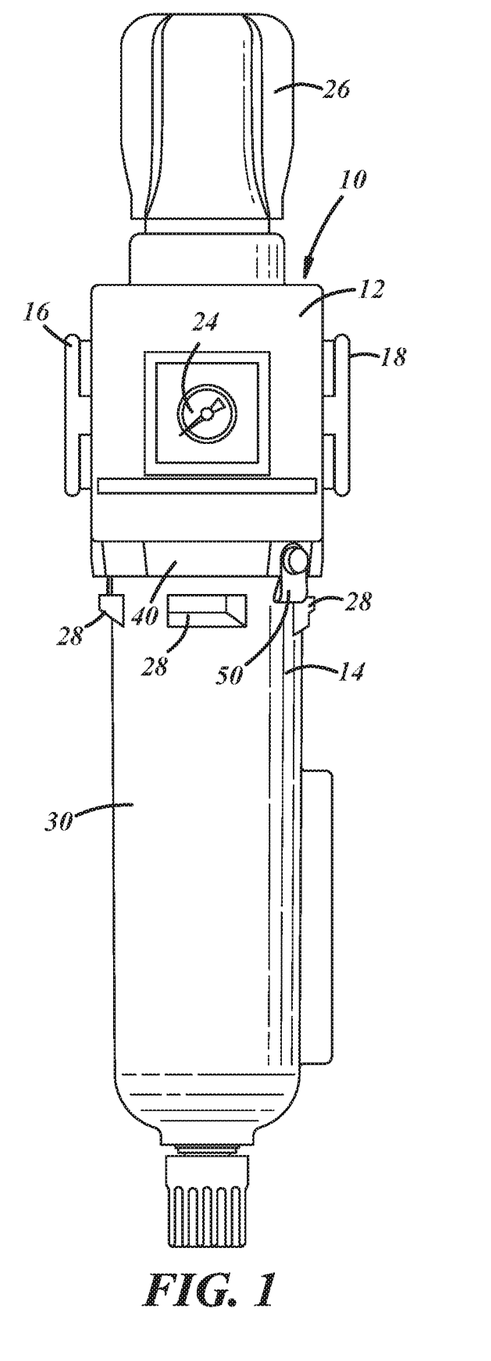
FIG. 1 is a side elevational view of a FRL assembly according to an embodiment of the invention with the collector bowl in an uninstalled position.
Figure 2:
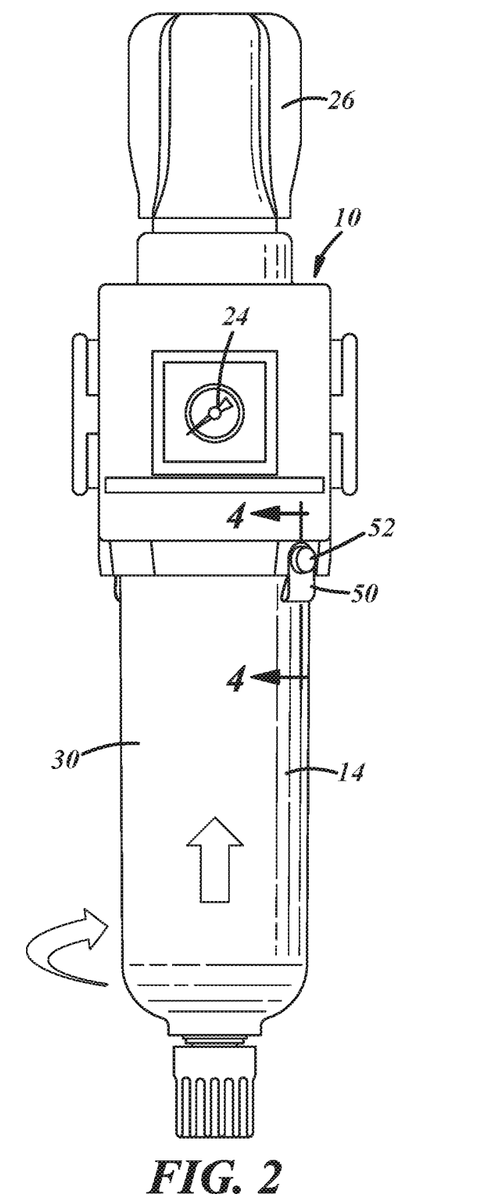
FIG. 2 is a side elevational view of the FRL shown in FIG. 1 with the collector bowl in a fully installed position.
Figure 4:
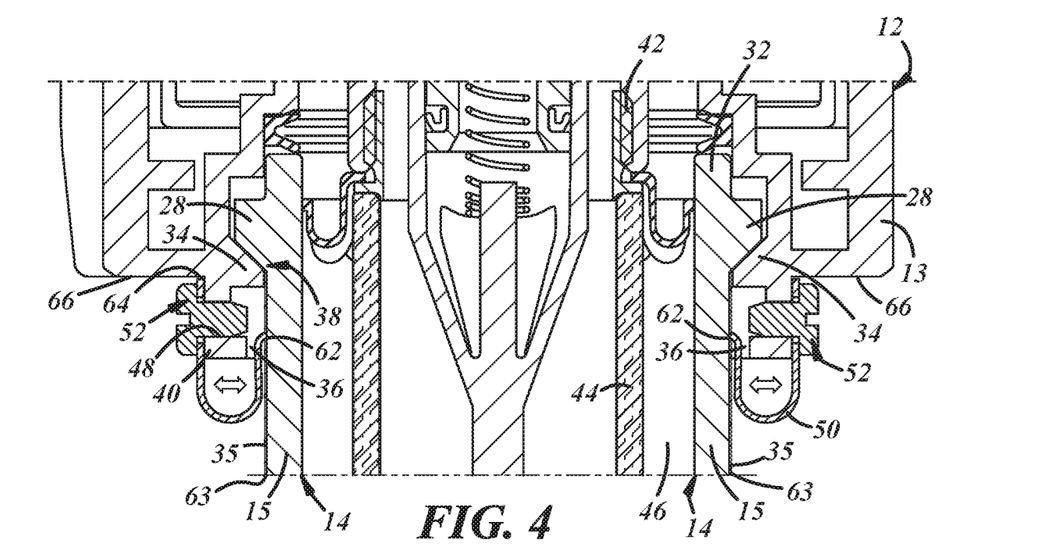
FIG. 4 is an enlarged fragmentary and sectional view of the FRL shown in FIG. 2 taken along lines 4-4 in FIG. 2 showing two opposed grounding clip members engaged to the collector bowl and fastened to the housing.
Figure 7:
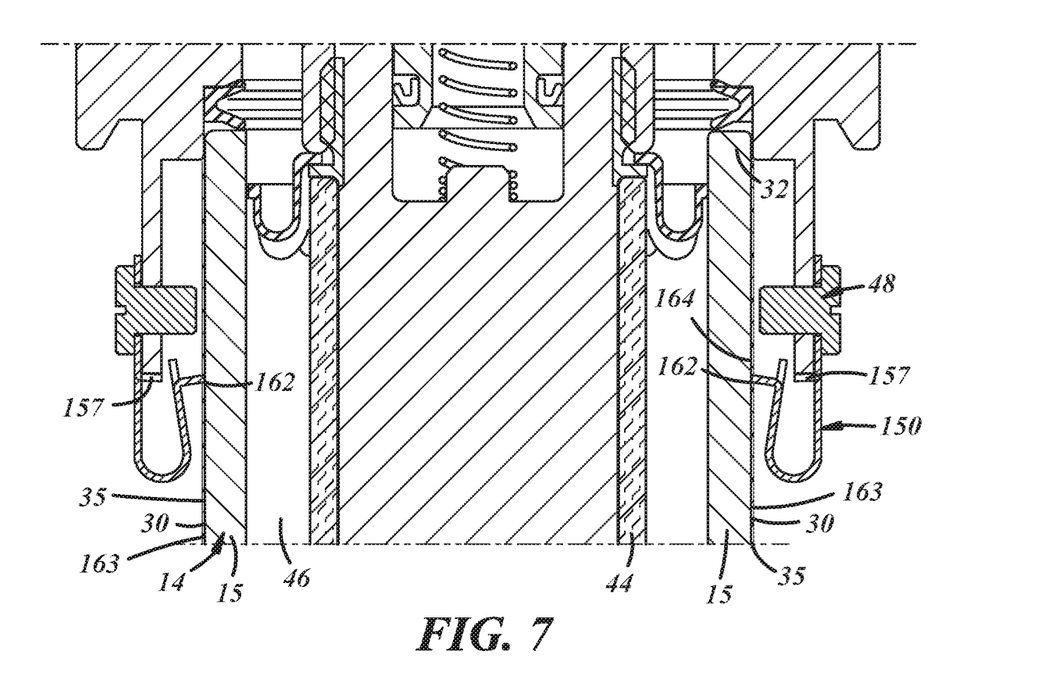
FIG. 7 is an enlarged fragmentary and sectional view showing a second embodiment of a grounding clip member engaged to the collector bowl and fastened to the housing.

Referring now to FIGS. 1, 4 and 7, an FRL 10 has an upper housing 12 and a lower collector bowl 14. The housing 12 made from a metal material 13 has opposite flange mountings 16 and 18 that have inlets 20 and outlet 22 passing therethrough as more clearly shown in FIG. 9. The FRL 10 as illustrated has a pressure gauge 24 and a regulator adjustment knob 26. The collector bowl 14 is also made out of a metal base material 15 and has protrusions 28 spaced about its exterior side 30 near the upper open end 32. As shown in FIG. 4, the housing has inwardly projecting complementary protrusions 34 that are also spaced about the lower opening 36 in housing 12. The complementary projections 28 and 34 are dimensioned and spaced about the respective housings and collector bowl to form a bayonet type connection 38 for the FRL. The exterior side 30 of the collector bowl has a paint coating 35.

The housing has a downwardly extending flange 40 circumscribing about the opening 36. The flange and opening are dimensioned to receive the collector bowl with its projections 28. The housing has an internal connection 42 for a filter 44 that is received in the interior 46 of the collector bowl. The housing may have a paint coating 35.

The flange 40 has fastener receiving apertures 48 for connecting a grounding clip 50 via a self-tapping fastener 52 that taps into the flange and pierces any paint coating in the unthreaded apertures 48 as it taps threads therein to be in direct contact with the metal material 13 as shown in FIG. 4. The fastener 52 passes through a mounting aperture 54 in the mounting side section 56 of clip 50. The fastener 52 is made from a metallic material or electrically conductive material. The top edge 64 of the clip is straight and is spaced from the aperture 54 to abut an undercut section 66 of the housing when the fastener 52 extends through hole 54 and mounts the clip to housing in order to stabilize the clip 50 from undesirable rotation or twisting when being fastened by fastener 52.

Preferably there are two apertures 48 circumferentially spaced about the flange 40 and both are circumferentially positioned about the flange 40 to be aligned under a respective protrusion 34.

Figure 5:
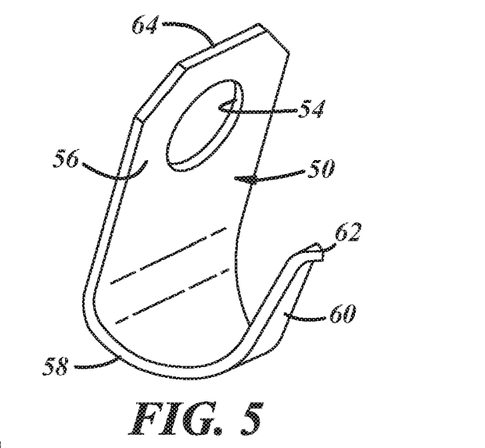
FIG. 5 is a perspective view of the grounding clip member shown in FIG. 1.
Figure 6:
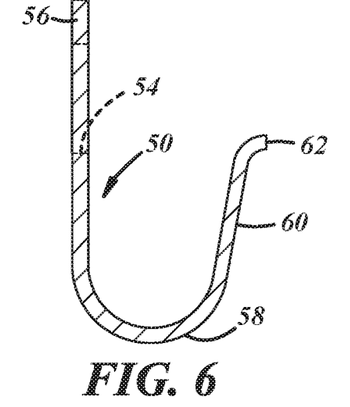
FIG. 6 is side elevational view of the grounding clip shown in FIG. 5.

The clip 50 as shown in FIGS. 5 and 6 is generally J-shaped and curves radially inwardly at a bight section 58 from the mounting hole section 56 to a distal end portion 60. The clip 50 is made from an electrically conductive material for example a metal material spring steel or other metal material and shaped to have resiliency. The distal end portion comes to a scratch point 62. The scratch point 62 is generally understood to include a point when viewed in one direction but may appear to be a sharp edge when viewed in another direction. The scratch point 62 is radially positioned to abut the exterior side 30 of the bowl and makes a scratch 63 that goes through the paint coating 35 to make direct contact with the metal material 15 under the paint coating 35 as shown schematically in FIG. 4. The scratch 63 has a vertical section that extends between protrusions 28 as shown in FIG. 3.

Figure 3:
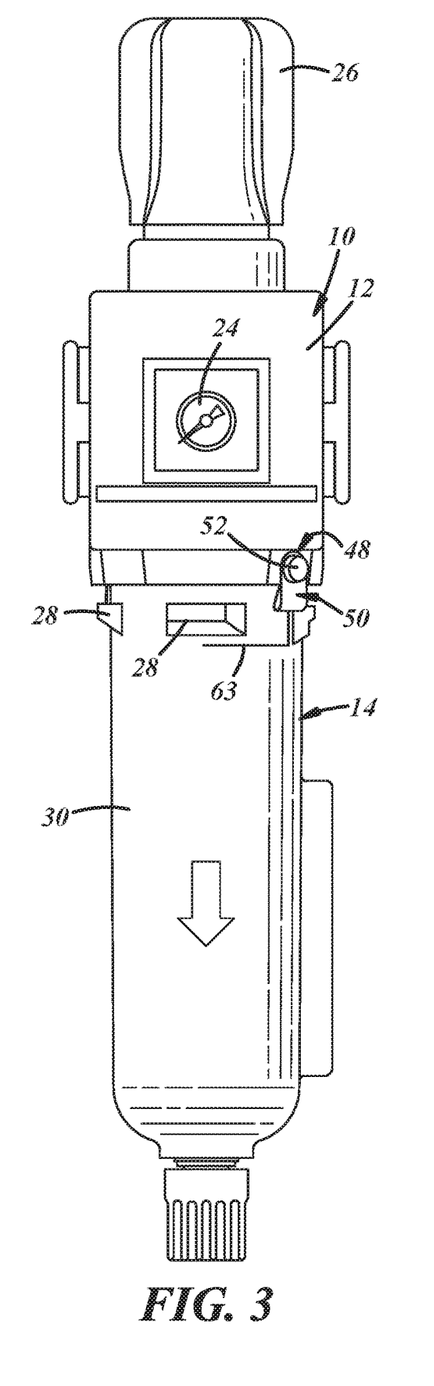
FIG. 3 is a side elevational view of the FRL shown in FIG. 2 shown in the uninstalled position after being installed for illustrating the scratch on the exterior of the collector bowl.

The scratch 63 through the paint coating 35 as illustrated schematically in FIG. 3 and formed by the scratch point 62 is normally concealed when viewed from an elevational or top perspective view relative to the flange 40. The scratch 63 becomes clearly visible only when the collector bowl is uninstalled by having the protrusions 28 and 34 disengage from each other having the collector bowl dropped to the uninstalled position as shown in FIG. 3.

As shown in FIG. 4, when installed, the clip 50 provides a direct electrical connection from the metal material 35 in the collector bowl, through the clip 50, fastener 52 and into housing 12. By having two clips 50 spaced on opposite sides of the collector bowl 14, any unbalancing torque forces by the opposite clips cancel each other and better assurance exists that at least one clip 50 will make contact through the paint coating and ground the collector bowl 14 to the housing 12. In this fashion, the collector bowl 14 is electrically grounded to the housing 12 through a scratch 56 made by a scratch point in clip 50.

Figure 8:
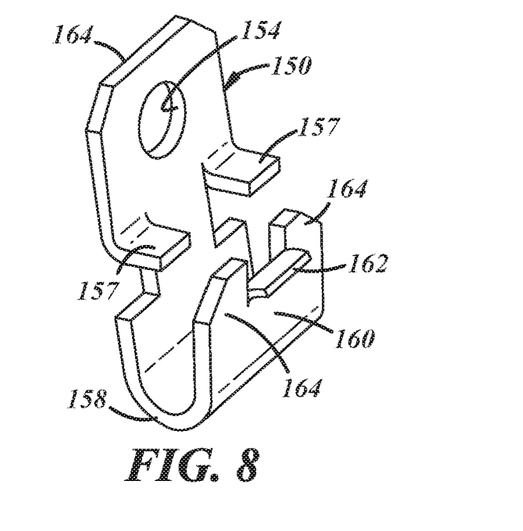
FIG. 8 is a perspective view of the grounding clip member shown in FIG. 7.

A second embodiment is shown in FIGS. 7 and 8. In this embodiment, a clip 150 has a mounting aperture 154 and is generally J-shaped and curves radially inwardly at a bight section 158 from the mounting hole section 156 to a distal end portion 160. The clip 150 is made from an electrically conductive material for example metal material such as spring steel or other metal material and shaped to have resiliency. The mounting hole section 156 also has two radially extending stabilizing lips 157 that are spaced from hole 154 to abut the bottom of housing 12 at flange 36 when the fastener 52 extends through aperture 154 and mounts the clip to housing. These lips 157 prevent the clip from undesirable rotation or twisting when the clip 150 is being fastened by the fastener 52. The distal end portion 160 has a radially bent distal scratch point 162. The scratch point 162 is radially positioned to abut the exterior side 30 of the bowl and scratches through the paint coating 35 to form scratch 163 and make direct contact with the metal material 15 under the paint coating 35 as shown schematically in FIG. 7. Legs 164 are at each side of scratch edge 162.

Figure 9:
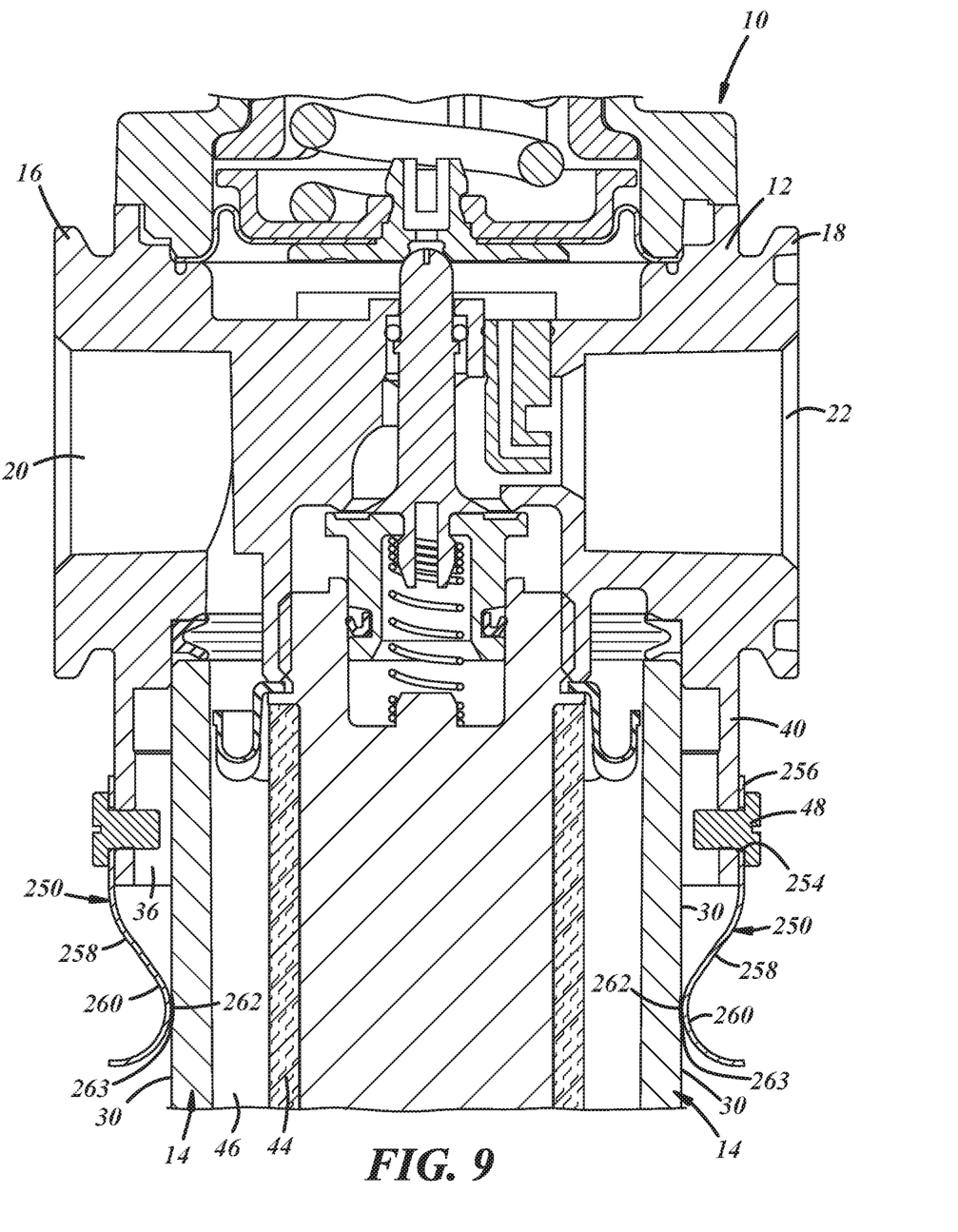
FIG. 9 is an enlarged fragmentary and sectional view showing a third embodiment of a grounding clip member engaged to the collector bowl and fastened to the housing.

A third embodiment is shown in FIG. 9. In this embodiment, the clip 250 has a mounting aperture 254 in aperture section 256. The clip 250 is made from an electrically conductive material such as spring steel or other metal and shaped to have resiliency. The clip 250 has a complex curve extending downwardly with a convex section 258 extending downwardly and radially inwardly to the collector bowl 14. The convex section 258 continuously blends into a lower concave section 260. The inside edge or apex 262 of the concave section 260 abuts the collector bowl. In this embodiment, there may not be a sharp edge but the paint may be locally removed from the collector bowl 14 just where apex 262 abuts the bowl 14 to provide conductive contact.

Figure 10:
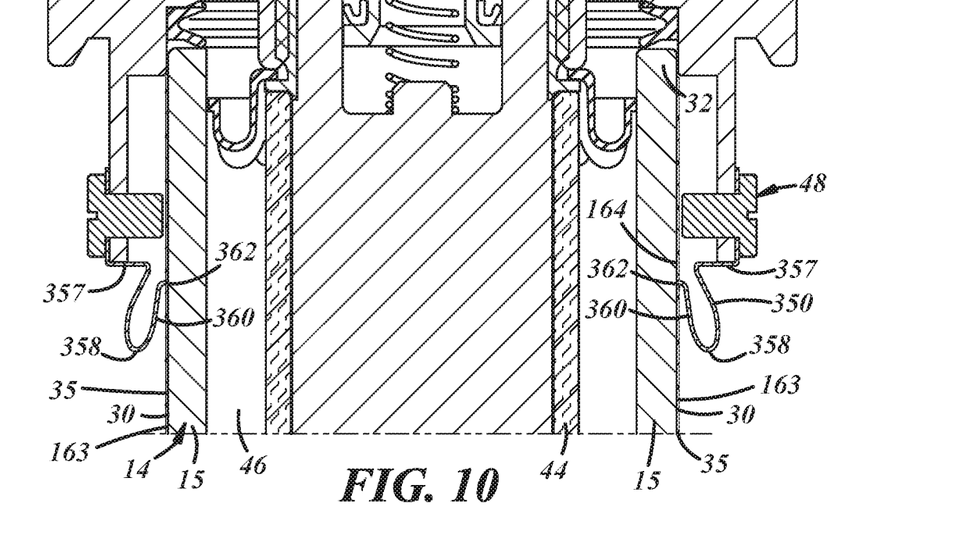
FIG. 10 is an enlarged fragment and sectional view showing a fourth embodiment of a grounding clip member engaged to the collector bowl and fastened to the housing.
Figures 11, 12:
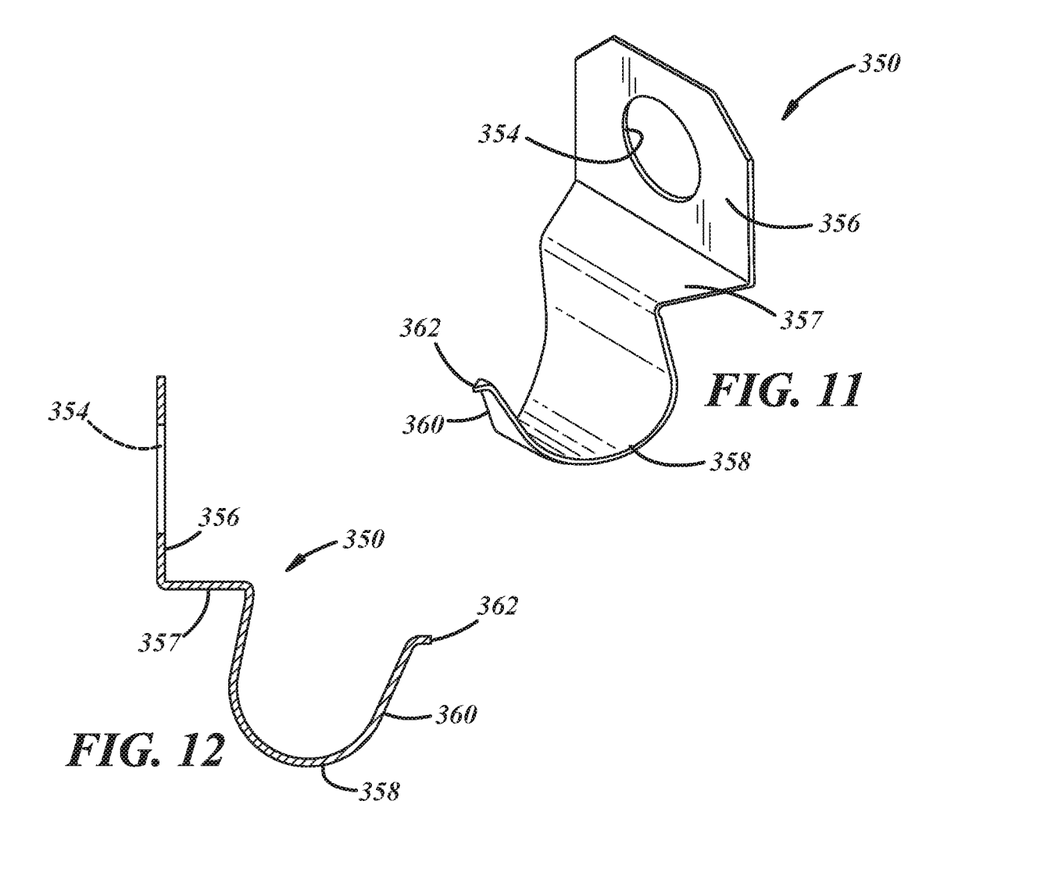
FIG. 11 is a respective view of the grounding clip shown in FIG. 10.
FIG. 12 is a side elevated view of the grounding clip shown in FIG. 11.

A fourth embodiment is shown in FIG. 10-12. In this embodiment, a clip 350 is generally J-shaped and curves radially inwardly at a bight section 358 from the mounting hole section 356 to a distal end portion 360. The clip 350 is made from an electrically conductive material for example a spring steel or other metal material and shaped to have resiliency. The distal end portion 360 comes to a scratch point 362. The mounting hole section 356 also has a radially extending ledge 357 that is spaced from mounting hole 354 to abut the bottom flange 36 of housing 12 when the fastener extends through hole 354 and mounts the clip 350 to housing to prevent the clip 350 from undesirable rotation about hole 354.

In this fashion, the collector bowl 14 can now be pre-painted without the fear of losing a grounding connection to the housing 12. The grounding can be reliably and expeditiously made with a clip at minimal cost that scratches through the paint coating and makes grounding contact with the metal material of the collector bowl.

Other variations and modifications are possible without departing from the scope and spirit of the present invention as defined by the appended claims.

The embodiments in which an exclusive property or privilege is claimed are defined as follows:

1. A grounded filter, regulator and lubricator assembly (FRL) for treating a pressurized air supply comprising:
   a housing being made from at least in part a metal base material and having an inlet and outlet for passing fluid therethrough and a connecting mechanism for connecting to a collector bowl; the collector bowl being made from a metal base material having an open end with a connecting mechanism and a closed distal end;
   said collector bowl and said housing being constructed to be movable with each other between an installed position and an uninstalled position;
   the housing having a flange that is electrically conductive and extending downwardly at an exterior of said bowl;
   at least one grounding clip member made from electrically conductive material having an exterior mounting end attached to the flange of the housing for electrical connectivity thereto;
   said at least one grounding clip and having a radially inner end that comes to a contact point for being in an electrically grounding contact with the metal base material of the collector bowl to connect the metal base materials of the collector bowl and the housing when said collector bowl and housing are in the installed portion;
   said contact point constructed to form a scratch point and to scratch an insulating protective coating that is adhered to an exterior surface of the collector bowl and to be in electrically grounding contact with the metal base material; and
   said at least one grounding clip member having its radially inner end curved upwardly to provide resiliency and to be positioned above a lower distal end of the flange when the housing and collector bowl are in the installed position.

2. Grounded FRL as defined in claim 1 further comprising:
   said exterior mounting end of said at least one grounding clip member having an aperture for receiving a self-tapping screw that self-taps into said flange and makes electrical connection with the flange of the housing.

3. Grounded FRL as defined in claim 2 further comprising:
   said at least one grounding clip member having a generally J-shape with the scratch point being at the distal end of the J-shape and facing radially inward to the collector bowl to form the electrical grounding contact at an exterior side of the collector bowl.

4. A grounded FRL as defined in claim 3 further comprising:
   said at least one grounding clip includes a first grounding clip and an opposing grounding clip member attached to the flange circumferentially spaced from and opposed to said first grounding clip member and having a respective scratch point constructed to scratch the insulating protective coating that is adhered to the exterior surface of the collector bowl and being in an electrically grounding contact with the metal base materials of the collector bowl and the housing.

5. A grounded filter, regulator and lubricator assembly (FRL) for treating a pressurized air supply comprising:
   a housing being made from at least in part a metal base material and having an inlet and outlet for passing fluid therethrough and a connecting mechanism for connecting to a collector bowl; the collector bowl being made from a metal base material having an open end with a connecting mechanism and a closed distal end;
   the housing having a flange that is electrically conductive and extending downwardly at an exterior of said bowl;
   two grounding clip members made from electrically conductive material having an exterior mounting end attached to the flange of the housing for electrical connectivity thereto, each grounding lip having a radially inner end that comes to a contact point for being in an electrically grounding contact with the metal base material of the collector bowl to connect the metal base materials of the collector bowl and the housing; and
   said two ground clip members being spaced on the opposite circumferential sides of the collector bowl to reduce unbalancing torque forces exerted by each clip member and to provide redundancy to assure grounding contact through housing and between the collector bowl.

6. A grounded FRL as defined in claim 5 further comprising:
   said contact point being sufficient stiff to form a scratch point and sufficient to scratch an insulating protective coating that is adhered to an exterior surface of the collector bowl and to be in electrically grounding contact with the metal base material.

7. A grounded FRL as defined in claim 6 further comprising:
   each grounding clip member having its radially inner end curved upwardly to provide resiliency and to be above a lower distal end of the flange.

8. A grounded FRL as defined in claim 7 further comprising:
   said exterior end of each grounding clip member having an aperture for receiving a self-tapping screw that self-taps into said flange and makes electrical connection with the flange of the housing.

9. A grounded FRL as defined in claim 8 further comprising:
   each grounding clip member having a generally J-shape with the scratch point being at the distal end of the J-shape and facing radially inward to the collector bowl to form the electrical grounding contact at an exterior side of the collector bowl.

10. A grounded FRL as defined in claim 9 further comprising:
    each grounding clip member being in a resilient state of compression when installed to assure positive connection between the housing and the collector bowl.

11. A grounded FRL as defined in claim 10 further comprising:

said connector mechanism of said collector bowl and said housing having complementary protrusions that form a bayonet fitting to mount the collector bowl to the housing; and each grounding clip member connected to said flange circumferentially aligned with one of the protrusions of said housing and having its scratch point scratching the insulating protective coating that is adhered to an exterior surface of the collector bowl between two protrusions of the collector bowl.

* * * * *